United States Patent
Funk et al.

(10) Patent No.: US 8,591,152 B2
(45) Date of Patent: Nov. 26, 2013

(54) METHOD FOR THE PNEUMATIC CONVEYING OF WATER-ABSORBENT POLYMER PARTICLES

(75) Inventors: Rüdiger Funk, Niedernhausen (DE); Hanno Rüdiger Wolf, Heidelberg (DE); Hermann Josef Feise, Kleinniedesheim (DE)

(73) Assignee: BASF SE, Ludwigshafen (DE)

( * ) Notice: Subject to any disclaimer, the term of this patent is extended or adjusted under 35 U.S.C. 154(b) by 309 days.

(21) Appl. No.: 12/281,535

(22) PCT Filed: Mar. 6, 2007

(86) PCT No.: PCT/EP2007/052100
§ 371 (c)(1),
(2), (4) Date: Sep. 3, 2008

(87) PCT Pub. No.: WO2007/104676
PCT Pub. Date: Sep. 20, 2007

(65) Prior Publication Data
US 2009/0022603 A1    Jan. 22, 2009

(30) Foreign Application Priority Data
Mar. 14, 2006   (EP) .................................... 06111108

(51) Int. Cl.
*B65G 53/00*    (2006.01)

(52) U.S. Cl.
USPC ............................................. 406/197; 415/1

(58) Field of Classification Search
USPC .............................................. 406/197; 415/1
See application file for complete search history.

(56) References Cited

U.S. PATENT DOCUMENTS

| | | | |
|---|---|---|---|
| 3,384,420 A * | 5/1968 | Fiscus | 406/173 |
| 3,709,562 A | 1/1973 | Feder | |
| 3,791,579 A * | 2/1974 | Cowan | 239/3 |
| 4,165,133 A * | 8/1979 | Johnson | 406/109 |
| 4,319,848 A * | 3/1982 | Lambertini et al. | 366/136 |
| 4,528,848 A * | 7/1985 | Hafner | 73/218 |
| 4,883,390 A * | 11/1989 | Reintjes et al. | 406/24 |
| 4,904,440 A | 2/1990 | Angstadt | |
| 4,908,175 A * | 3/1990 | Angstadt | 264/113 |
| 4,927,582 A | 5/1990 | Bryson | |
| 5,102,585 A | 4/1992 | Pieper et al. | |
| 6,211,101 B1 * | 4/2001 | Tsutsui et al. | 442/118 |
| 6,648,558 B1 * | 11/2003 | Shultz | 406/195 |
| 6,716,894 B2 * | 4/2004 | Kajikawa et al. | 522/150 |
| 6,727,345 B2 * | 4/2004 | Kajikawa et al. | 528/502 R |
| 6,817,557 B2 * | 11/2004 | Kakita et al. | 241/23 |
| 7,193,006 B2 * | 3/2007 | Ishizaki et al. | 524/500 |
| 7,429,632 B2 * | 9/2008 | Mitchell | 525/326.6 |
| 8,410,223 B2 * | 4/2013 | Matsumoto et al. | 525/330.2 |

(Continued)

OTHER PUBLICATIONS

Graham et al., *Modern Superabsorbent Polymer Technology*, F.L. Buchholz and A.T. Graham, Wiley-VCH (69-117).

(Continued)

*Primary Examiner* — Joseph Dillon, Jr.
(74) *Attorney, Agent, or Firm* — Marshall, Gerstein & Borun LLP

(57) ABSTRACT

A process for pneumatic delivery of water-absorbing polymer particles, the compressor used for pneumatic delivery having a steep characteristic and the initial gas rate in the delivery corresponding to a Froude number of from 10 to 18.

13 Claims, 1 Drawing Sheet

(56) References Cited

U.S. PATENT DOCUMENTS

| | | | |
|---|---|---|---|
| 2002/0072577 A1* | 6/2002 | Jacobsen et al. | 526/129 |
| 2002/0106461 A1* | 8/2002 | Talton | 427/596 |
| 2004/0110006 A1* | 6/2004 | Ishizaki et al. | 428/402 |
| 2004/0213892 A1* | 10/2004 | Jonas et al. | 427/2.3 |
| 2005/0085599 A1* | 4/2005 | Olson et al. | 526/70 |
| 2005/0272906 A1* | 12/2005 | Cavaglia | 528/272 |
| 2005/0284206 A1* | 12/2005 | Morehead et al. | 72/481.1 |
| 2006/0249100 A1* | 11/2006 | Freytag et al. | 122/400 |
| 2006/0266636 A1* | 11/2006 | Stroder et al. | 204/157.15 |
| 2007/0167549 A1* | 7/2007 | Bornemann et al. | 524/318 |
| 2007/0203304 A1* | 8/2007 | Mitchell | 525/330.3 |
| 2009/0026111 A1* | 1/2009 | Garton et al. | 208/49 |
| 2009/0035579 A1* | 2/2009 | Coufal et al. | 428/403 |
| 2009/0321664 A1* | 12/2009 | Stueven et al. | 250/492.1 |
| 2010/0074805 A1* | 3/2010 | Nuber et al. | 422/142 |
| 2010/0112200 A1* | 5/2010 | Barthel et al. | 427/185 |
| 2010/0160883 A1* | 6/2010 | Jonas et al. | 604/368 |
| 2010/0298760 A1* | 11/2010 | Olle et al. | 604/20 |
| 2011/0028670 A1* | 2/2011 | Matsumoto et al. | 526/317.1 |
| 2011/0088806 A1* | 4/2011 | Nogi et al. | 141/1 |
| 2011/0110730 A1* | 5/2011 | Nogi et al. | 406/197 |
| 2011/0194904 A1* | 8/2011 | Carlson | 406/12 |

OTHER PUBLICATIONS

Kalman, *Powder Technology*, 112, 244-250 (2000).

* cited by examiner

METHOD FOR THE PNEUMATIC CONVEYING OF WATER-ABSORBENT POLYMER PARTICLES

CROSS-REFERENCE TO RELATED APPLICATIONS

This is the U.S. national phase of International Application No. PCT/EP2007/052100, filed Mar. 6, 2007, which claims the benefit of European Patent Application No. 06111108.4, filed Mar. 14, 2006.

TECHNICAL FIELD

The present invention relates to processes for pneumatic delivery of water-absorbing polymer particles, the compressor used for pneumatic delivery having a steep characteristic.

BACKGROUND

Water-absorbing polymers are especially polymers of (co)polymerized hydrophilic monomers, graft (co)polymers of one or more hydrophilic monomers on a suitable graft base, crosslinked cellulose ethers or starch ethers, crosslinked carboxymethylcellulose, partly crosslinked polyalkylene oxide or natural products swellable in aqueous liquids, for example guar derivatives. Such polymers, as products which absorb aqueous solutions, are used to produce diapers, tampons, sanitary napkins and other hygiene articles, but also as water-retaining agents in market gardening.

Water-absorbing polymers typically have a Centrifuge Retention Capacity of from 25 to 60 g/g, preferably of at least 30 g/g, preferentially of at least 32 g/g, more preferably of at least 34 g/g, most preferably of at least 35 g/g. The Centrifuge Retention Capacity (CRC) is determined according to the EDANA (European Disposables and Nonwovens Association) recommended test method No. 441.2-02 "Centrifuge Retention Capacity".

The preparation of water-absorbing polymers is described, for example, in "Modern Superabsorbent Polymer Technology", F. L. Buchholz and A. T. Graham, Wiley-VCH, 1998, pages 69 to 117. Water-absorbing polymer particles are preferably transported by means of pneumatic delivery systems. The mechanical stress which inevitably occurs leads to undesired attrition. Therefore, low transport speeds and hence reduced mechanical stresses are desirable.

In principle, a distinction can be drawn between three different delivery types in pneumatic conveying.

1. In the case of aerial delivery and stream delivery in the region of high gas rates, the laws of the free-flowing individual particle apply approximately. This is the classical type of pneumatic delivery. No product deposits whatsoever occur. There is essentially uniform delivery material distribution in the tube.
2. When the gas rate falls, the delivery moves into the range of strand delivery, where the delivery material flows in the lower half of the tube in particular. In the upper half of the tube, there is aerial delivery.
3. At low gas rates, the delivery proceeds extremely gently as dense stream delivery (plug delivery, impulse delivery) with high pressure drop.

In principle, the pressure delivery can work with slower delivery rates than suction delivery, since the pressure reserves under elevated pressure are greater than under reduced pressure, and since the delivery gas density which drives the product onward increases with rising pressure.

Since delivery gas is compressible, there is no constant pressure in the delivery line, but rather a higher pressure at the start than at the end. However, this also changes the gas volume, so that, at the start, at higher pressure, slower gas rates predominate, and, at the end, at lower pressure, higher gas rates predominate.

H. Kalman, Powder Technology 104 (1999) 214-220 describes investigations of the attrition in pneumatic delivery systems. Owing to the relatively low mechanical stress, relatively low delivery rates are advantageous. According to the publication, often unnecessarily high delivery rates are, however, often selected for safety reasons in pneumatic delivery.

Excessively low delivery rates in the region of strands delivery are problematic, since stable delivery is not possible in the unstable region between dense stream delivery and strand delivery. Instead, the mechanical stresses which occur can lead to severe damage to the delivery system, up to and including pulling of the delivery lines out of the mounts.

It was an object of the present invention to provide an improved process for pneumatic delivery of water-absorbing polymer particles, reliable operation being possible especially at low delivery rates.

DETAILED DESCRIPTION

Figure 1:
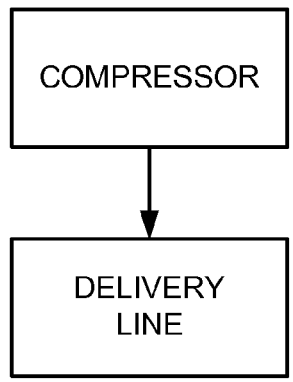
FIG. 1 is a schematic of the compressor and delivery line according to the present disclosure.
Figure 2:
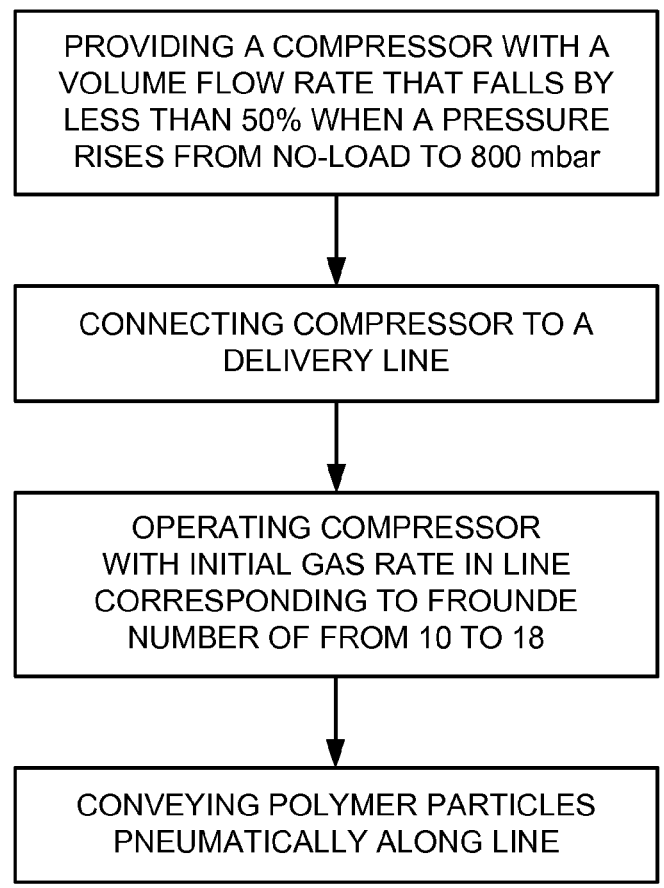
FIG. 2 is a block diagram of the method according to the present disclosure.

The object is achieved by a process for pneumatic delivery of water-absorbing polymer particles, wherein the volume flow rate of the compressor used for pneumatic delivery falls by less than 50% when the pressure rises from no-load operation to 800 mbar and the initial gas rate in the delivery corresponds to a Froude number of from 10 to 18.

The volume flow rate decrease of the compressors used is preferably less than 30%, most preferably less than 20%, most preferably less than 10%. The volume flow rate decrease can either be measured or determined with reference to the compressor characteristic. Accordingly, the compressors useable in the process according to the invention have a steep characteristic. Preferred compressors are forced compressors. A particularly suitable force compressor with steep characteristic is a rotary piston blower.

The optimal initial gas rate in the pneumatic delivery depends upon the diameter of the delivery line. This dependence is best described with the Froude number:

$$Fr = \frac{v}{\sqrt{D \times g}}$$

Fr Froude number
v Gas rate
D Inner diameter of the transport line
g Acceleration due to gravity The Froude number in the inventive pneumatic delivery is preferably from 10 to 16, more preferably from 11 to 15, most preferably from 12 to 14.

At excessively low delivery rates, the pneumatic delivery becomes unstable, and relatively high delivery rates increase the undesired attrition owing to rising mechanical stress.

The delivery material loading of the pneumatic delivery is preferably from 0.5 to 20 kg/kg, more preferably from 1 to 10 kg/kg, most preferably from 2 to 8 kg/kg, the delivery material loading being the quotient of delivery material mass flow rate and gas mass flow rate.

In principle, the optimal initial gas rate also increases with rising delivery material loading.

The diameter of the pipeline in which the pneumatic delivery is carried out is preferably from 3 to 30 cm, more preferably from 4 to 25 cm, most preferably from 5 to 20 cm. Excessively low tube diameters lead to a higher mechanical stress as a result of the pneumatic delivery and hence promote the undesired attrition. Excessively large tube diameters enable an equally undesired settling of the water-absorbing polymer particles in the delivery line.

In order to minimize the mechanical stress, the number of curves in the pipeline of a pneumatic delivery system should be at a minimum, preferably fewer than 6, preferentially fewer than 5, more preferably fewer than 4, most preferably fewer than 3. A pipeline in a pneumatic delivery system is the section between the introduction unit for the water-absorbing polymer particles and the receiving vessel, i.e. the region in which the water-absorbing polymer particles are transported in the gas stream.

The water content of the water-absorbing polymer particles is preferably less than 10% by weight, more preferably less than 5% by weight, most preferably from 1 to 5% by weight, the water content being determined by the EDANA (European Disposables and Nonwovens Association) recommended test method No. 430.2-02 "Moisture content". The mechanical stability of the water-absorbing polymer particles decreases with the water content, i.e. the undesired attrition increases. Excessively high water contents during the pneumatic delivery can lead to plastic deformation of the polymer particles (formation of "angel hair") or lead to blockages.

The water-absorbing polymer particles preferably have a particle diameter of less than 1000 μm to an extent of at least 90% by weight, more preferably a particle diameter of less than 900 μm to an extent of at least 95% by weight, most preferably a particle diameter of less than 800 μm to an extent of at least 98% by weight.

The process according to the invention lowers the mechanical stress during the pneumatic delivery to such an extent that the proportion of polymer particles having a particle diameter of less than 150 μm is increased by the pneumatic delivery preferably by less than 1% by weight, more preferably by less than 0.7% by weight, most preferably by less than 0.5% by weight, based in each case on the total amount of polymer particles, and the permeability of the polymer particles falls preferably by less than $5\times10^{-7}$ cm³s/g, more preferably by less than $4\times10^{-7}$ cm³s/g, most preferably by less than $3\times10^{-7}$ cm³s/g as a result of the pneumatic delivery.

The water-absorbing polymer particles useable in the process according to the invention can be prepared by polymerizing a monomer solution comprising a) at least one ethylenically unsaturated, acid-bearing monomer,
b) at least one crosslinker,
c) if desired one or more ethylenically and/or allylically unsaturated monomers copolymerizable with a) and
d) if desired one or more water-soluble polymers onto which monomers a), b) and if appropriate c) can be grafted at least partly, the resulting polymer being dried, classified, e) if desired aftertreated with at least one postcrosslinker, dried, thermally postcrosslinked and
f) if desired aftertreated with at least one polyvalent cation.

Suitable monomers a) are, for example, ethylenically unsaturated carboxylic acids such as acrylic acid, methacrylic acid, maleic acid, fumaric acid and itaconic acid. Particularly preferred monomers are acrylic acid and methacrylic acid. Very particular preference is given to acrylic acid.

The content of acrylic acid and/or salts thereof in the total amount of monomers a) is preferably at least 50 mol %, more preferably at least 90 mol %, most preferably at least 95 mol %.

The monomers a), especially acrylic acid, comprise preferably up to 0.025% by weight of a hydroquinone monoether. Preferred hydroquinone monoethers are hydroquinone monomethyl ether (MEHQ) and/or tocopherols.

Tocopherol refers to compounds of the following formula

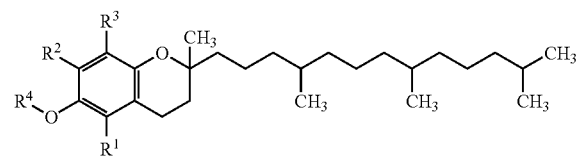

where $R^1$ is hydrogen or methyl, $R^2$ is hydrogen or methyl, $R^3$ is hydrogen or methyl and $R^4$ is hydrogen or an acyl radical having from 1 to 20 carbon atoms.

Preferred $R^4$ radicals are acetyl, ascorbyl, succinyl, nicotinyl and other physiologically tolerable carboxylic acids. The carboxylic acids may be mono-, di- or tricarboxylic acids.

Preference is given to alpha-tocopherol where $R^1=R^2=R^3=$methyl, especially racemic alpha-tocopherol. $R^4$ is more preferably hydrogen or acetyl. Especially preferred is RRR-alpha-tocopherol.

The monomer solution comprises preferably not more than 130 ppm by weight, more preferably not more than 70 ppm by weight, preferably not less than 10 ppm by weight, more preferably not less than 30 ppm by weight and especially about 50 ppm by weight of hydroquinone monoether, based in each case on acrylic acid, with acrylic acid salts being counted as acrylic acid. For example, the monomer solution can be prepared using acrylic acid having an appropriate hydroquinone monoether content.

The water-absorbing polymers are crosslinked, i.e. the polymerization is carried out in the presence of compounds having at least two polymerizable groups which can be free-radically polymerized into the polymer network. Suitable crosslinkers b) are, for example, ethylene glycol dimethacrylate, diethylene glycol diacrylate, allyl methacrylate, trimethylolpropane triacrylate, triallylamine, tetraallyloxyethane, as described in EP-A-0 530 438, di- and triacrylates, as described in EP-A-0 547 847, EP-A-0 559 476, EP-A-0 632 068, WO-A-93/21237, WO-A-03/104299, WO-A-03/104300, WO-A-03/104301 and DE-A-10331450, mixed acrylates which, as well as acrylate groups, comprise further ethylenically unsaturated groups, as described in DE-A-103 31 456 and DE-A-103 55 401, or crosslinker mixtures as described, for example, in DE-A-195 43 368, DE-A-196 46 484, WO-A-90/15830 and WO-A-02/32962.

Suitable crosslinkers b) include in particular N,N'-methylenebisacrylamide and N,N'-methylenebismethacrylamide, esters of unsaturated mono- or polycarboxylic acids of polyols, such as diacrylate or triacrylate, for example butanediol diacrylate, butanediol dimethacrylate, ethylene glycol diacrylate, ethylene glycol dimethacrylate and also trimethylolpropane triacrylate and allyl compounds, such as allyl (meth) acrylate, triallyl cyanurate, diallyl maleate, polyallyl esters, tetraallyloxyethane, triallylamine, tetraallylethylenediamine, allyl esters of phosphoric acid and also vinylphosphonic acid derivatives as described, for example, in EP-A-0 343 427. Suitable crosslinkers b) further include pentaerythritol diallyl ether, pentaerythritol triallyl ether, pentaerythritol tetraallyl ether, polyethylene glycol diallyl ether, ethylene glycol diallyl ether, glycerol diallyl ether, glycerol triallyl ether, polyallyl ethers based on sorbitol, and also ethoxylated variants thereof. In the process of the invention, it is possible to use di(meth)acrylates of polyethylene glycols, the polyethylene glycol used having a molecular weight between 300 and 1000.

However, particularly advantageous crosslinkers b) are di- and triacrylates of 3- to 20-tuply ethoxylated glycerol, of 3- to 20-tuply ethoxylated trimethylolpropane, of 3- to 20-tuply ethoxylated trimethylolethane, especially di- and triacrylates of 2- to 6-tuply ethoxylated glycerol or of 2- to 6-tuply ethoxylated trimethylolpropane, of 3-tuply propoxylated glycerol, of 3-tuply propoxylated trimethylolpropane, and also of 3-tuply mixed ethoxylated or propoxylated glycerol, of 3-tuply mixed ethoxylated or propoxylated trimethylolpropane, of 15-tuply ethoxylated glycerol, of 15-tuply ethoxylated trimethylolpropane, of at least 40-tuply ethoxylated glycerol, of at least 40-tuply ethoxylated trimethylolethane and also of at least 40-tuply ethoxylated trimethylolpropane.

Very particularly preferred crosslinkers b) are polyethoxylated and/or -propoxylated glycerols which have been esterified with acrylic acid or methacrylic acid to di- or triacrylates, as described, for example, in DE-A 103 19 462. Di- and/or triacrylates of 3- to 10-tuply ethoxylated glycerol are particularly advantageous. Very particular preference is given to di- or triacrylates of 1- to 5-tuply ethoxylated and/or propoxylated glycerol. The triacrylates of 3- to 5-tuply ethoxylated and/or propoxylated glycerol are most preferred. These are notable for particularly low residual levels (typically below 10 ppm by weight) in the water-absorbing polymer and the aqueous extracts of the water-absorbing polymers produced therewith have an almost unchanged surface tension (typically not less than 0.068 N/m) compared with water at the same temperature.

The amount of crosslinker b) is preferably from 0.01 to 1% by weight, more preferably from 0.05 to 0.5% by weight, most preferably from 0.1 to 0.3% by weight, all based on the monomer a).

Examples of ethylenically unsaturated monomers c) which are copolymerizable with the monomers a) are acrylamide, methacrylamide, crotonamide, dimethylaminoethyl methacrylate, dimethylaminoethyl acrylate, dimethylaminopropyl acrylate, diethylaminopropyl acrylate, dimethylaminobutyl acrylate, dimethylaminoethyl methacrylate, diethylaminoethyl methacrylate, dimethylaminoneopentyl acrylate and dimethylaminoneopentyl methacrylate.

Useful water-soluble polymers d) include polyvinyl alcohol, polyvinylpyrrolidone, starch, starch derivatives, polyglycols or polyacrylic acids, preferably polyvinyl alcohol and starch.

The preparation of a suitable polymer and also further suitable hydrophilic ethylenically unsaturated monomers a) are described in DE-A-1 99 41 423, EP-A-0 686 650, WO-A-01/45758 and WO-A-03/104300.

Suitable reactors are kneading reactors or belt reactors. In the kneader, the polymer gel formed in the polymerization of an aqueous monomer solution is comminuted continuously by, for example, contrarotatory stirrer shafts, as described in WO-A-01/38402. The polymerization on the belt is described, for example, in DE-A-38 25 366 and U.S. Pat. No. 6,241,928. Polymerization in a belt reactor forms a polymer gel which has to be comminuted in a further process step, for example in a meat grinder, extruder or kneader.

Advantageously, the hydrogel, after leaving the polymerization reactor, is then stored, for example in insulated vessels, at elevated temperature, preferably at least 50° C., more preferably at least 70° C., most preferably at least 80° C., and preferably less than 100° C. The storage, typically for from 2 to 12 hours, further increases the monomer conversion.

The acid groups of the resulting hydrogels have typically been partially neutralized, preferably to an extent of from 25 to 95 mol %, more preferably to an extent of from 50 to 80 mol % and even more preferably to an extent of from 60 to 75 mol %, for which the customary neutralizing agents can be used, preferably alkali metal hydroxides, alkali metal oxides, alkali metal carbonates or alkali metal hydrogencarbonates and also mixtures thereof. Instead of alkali metal salts, it is also possible to use ammonium salts. Particularly preferred alkali metals are sodium and potassium, but very particular preference is given to sodium hydroxide, sodium carbonate or sodium hydrogencarbonate and also mixtures thereof.

Neutralization is preferably carried out at the monomer stage. It is done typically by mixing in the neutralizing agent as an aqueous solution, as a melt, or else preferably as a solid material. For example, sodium hydroxide having a water content of distinctly below 50% by weight can be present as a waxy mass having a melting point of above 23° C. In this case, metering as piece material or melt at elevated temperature is possible.

However, it is also possible to carry out neutralization after the polymerization, at the hydrogel stage. It is also possible to neutralize up to 40 mol %, preferably from 10 to 30 mol % and more preferably from 15 to 25 mol % of the acid groups before the polymerization by adding a portion of the neutralizing agent to the monomer solution and setting the desired final degree of neutralization only after the polymerization, at the hydrogel stage. When the hydrogel is neutralized at least partly after the polymerization, the hydrogel is preferably comminuted mechanically, for example by means of a meat grinder, in which case the neutralizing agent can be sprayed, sprinkled or poured on and then carefully mixed in. To this end, the gel mass obtained can be repeatedly ground in a meat grinder for homogenization.

The hydrogel is then preferably dried with a belt dryer until the residual moisture content is preferably below 15% by weight and especially below 10% by weight, the water content being determined by EDANA (European Disposables and Nonwovens Association) recommended test method No. 430.2-02 "Moisture content". If desired, however, drying can also be carried out using a fluidized bed dryer or a heated plowshare mixer. To obtain particularly white products, it is advantageous to dry this gel while ensuring rapid removal of the evaporating water. To this end, the dryer temperature must be optimized, the air feed and removal has to be controlled, and sufficient venting must be ensured in each case. The higher the solids content of the gel, the simpler the drying, by its nature, and the whiter the product. The solids content of the gel before the drying is therefore preferably between 30% and 80% by weight. It is particularly advantageous to vent the dryer with nitrogen or another nonoxidizing inert gas. If desired, however, it is also possible simply just to lower the partial pressure of the oxygen during the drying in order to prevent oxidative yellowing processes. In general, though, adequate venting and removal of the water vapor also still lead to an acceptable product. A very short drying time is generally advantageous with regard to color and product quality.

Thereafter, the dried hydrogel is ground and classified, and the apparatus used for grinding may typically be single- or multistage roll mills, preferably two- or three-stage roll mills, pin mills, hammer mills or vibratory mills.

The resulting polymer particles can then be postcrosslinked. Postcrosslinkers e) suitable for this purpose are compounds which comprise at least two groups which can form covalent bonds with the carboxylate groups of the polymers. Suitable compounds are, for example, alkoxysilyl compounds, polyaziridines, polyamines, polyamidoamines, di- or polyglycidyl compounds, as described in EP-A-0 083 022, EP-A-543 303 and EP-A-937 736, polyhydric alcohols, as described in DE-C-33 14 019, DE-C-35 23 617 and EP-A-450 922, or p-hydroxyalkylamides, as described in DE-A 102 04 938 and U.S. Pat. No. 6,239,230. Also suitable are compounds with mixed functionality, such as glycidol, 3-ethyl-3-oxetanemethanol (trimethylolpropaneoxetane), as described in EP-A-1 199 327, aminoethanol, diethanolamine, triethanolamine or compounds which form a further functionality after the first reaction, such as ethylene oxide, propylene oxide, isobutylene oxide, aziridine, azetidine or oxetane.

In addition, DE-A-40 20 780 describes cyclic carbonates, DE-A-198 07 502 2-oxazolidone and its derivatives such as N-(2-hydroxyethyl)-2-oxazolidone, DE-A-1 98 07 992 bis- and poly-2-oxazolidinones, DE-A-1 98 54 573 2-oxotetrahydro-1,3-oxazine and its derivatives, DE-A-198 54 574 N-acyl-2-oxazolidones, DE-A-1 02 04 937 cyclic ureas, DE-A-1 03 34 584 bicyclic amide acetals, EP-A-1 199 327 oxetanes and cyclic ureas, and WO-A-03/031482 morpholine-2,3-dione and its derivatives, as suitable postcrosslinkers e).

Preferred postcrosslinkers e) are oxazolidone and its derivatives, especially N-(2-hydroxyethyl)-2-oxazolidone.

The amount of postcrosslinker e) is preferably from 0.01 to 1% by weight, more preferably from 0.05 to 0.5% by weight, most preferably from 0.1 to 0.2% by weight, based on the polymer.

The postcrosslinking is typically carried out in such a way that a solution of the postcrosslinker e) is sprayed onto the hydrogel or the dry polymer particles. The spray application is followed by thermal drying, and the postcrosslinking reaction may take place either before or during drying.

The spray application of a solution of the crosslinker is preferably carried out in mixers with moving mixing tools, such as screw mixers, paddle mixers, disk mixers, plowshare mixers and shovel mixers. Particular preference is given to vertical mixers, very particular preference to plowshare mixers and shovel mixers. Suitable mixers are, for example, Lödige® mixers, Bepex® mixers, Nauta® mixers, Processall® mixers and Schugi® mixers.

The thermal drying is preferably carried out in contact dryers, more preferably shovel dryers, most preferably disk dryers. Suitable dryers are, for example, Bepex® dryers and Nara® dryers. Moreover, it is also possible to use fluidized bed dryers.

The drying can be effected in the mixer itself, by heating the jacket or blowing in warm air. Equally suitable is a downstream dryer, for example a tray dryer, a rotary tube oven or a heatable screw. It is also possible, for example, to utilize an azeotropic distillation as the drying process.

Preferred drying temperatures are in the range from 170 to 250° C., preferably from 180 to 220° C., and more preferably from 190 to 210° C. The preferred residence time at this temperature in the reaction mixer or dryer is preferably at least 10 minutes, more preferably at least 20 minutes, most preferably at least 30 minutes.

The water-absorbing polymer particles may additionally be aftertreated with at least one polyvalent cation f). Suitable cations f) are, for example, divalent cations such as the cations of zinc, magnesium, calcium and strontium, trivalent cations such as the cations of aluminum, iron, chromium, rare earths and manganese, tetravalent cations such as the cations of titanium and zirconium. Possible counterions are chloride, bromide, sulfate, hydrogensulfate, carbonate, hydrogencarbonate, nitrate, phosphate, hydrogenphosphate, dihydrogenphosphate and carboxylate, such as acetate and lactate. Aluminum sulfate is preferred.

Typically, the polyvalent cation 0 is used in the form of an aqueous solution. The concentration of the polyvalent cation f) in the aqueous solution is, for example, from 0.1 to 12% by weight, preferably from 0.5 to 8% by weight, more preferably from 1.5 to 4% by weight.

The amount of polyvalent cation f) is preferably from 0.001 to 0.25% by weight, more preferably from 0.005 to 0.2% by weight, most preferably from 0.01 to 0.15% by weight, based in each case on the polymer.

The polyvalent cations f) are preferably applied during the aftertreatment, in which case postcrosslinker e) and cation f) are preferably metered in via separate solutions.

The present invention further provides the polymers obtainable by the process according to the invention and also hygiene articles, especially diapers, which comprise them.

The process according to the invention enables the reliable transport of water-absorbing polymer particles in the region of strand delivery. The process according to the invention is extremely operationally reliable and enables pneumatic delivery at distinctly lower delivery rates. It is not possible to achieve such high operational reliability with conventional compressors with flat characteristic, for example ventilators.

Methods:

The measurements should, unless stated otherwise, be carried out at an ambient temperature of 23±2° C. and a relative atmospheric humidity of 50±10%. The water-absorbing polymer particles are mixed thoroughly before the measurement.

Absorbency Under Load (AUL0.7 psi)

The Absorbency Under Load is determined by the EDANA (European Disposables and Nonwovens Association) recommended test method No. 442.2-02 "Absorption Under Pressure".

Permeability (SFC, Saline Flow Conductivity)

The permeability of a swollen gel layer under pressure load of 0.3 psi (2070 Pa) is, as described in EP-A-0 640 330, determined as the gel layer permeability of a swollen gel layer of superabsorbent polymer, although the apparatus described on page 19 and in FIG. 8 in the aforementioned patent application was modified to the effect that the glass frit (40) is no longer used, the plunger (39) consists of the same polymer material as the cylinder (37) and now comprises 21 drillholes of equal size distributed uniformly over the entire contact surface. The procedure and the evaluation of the measurement remains unchanged from EP-A-0 640 330. The flow rate is recorded automatically.

The permeability (SFC) is calculated as follows:

$$SFC[cm^3 s/g] = (Fg(t=0) \times L0)/(d \times A \times WP),$$

where Fg(t=0) is the flow rate of NaCl solution in g/s, which is obtained by means of a linear regression analysis of the Fg(t) data of the flow determinations by extrapolation to t=0, L0 is the thickness of the gel layer in cm, d is the density of the NaCl solution in $g/cm^3$, A is the surface area of the gel layer in $cm^2$ and WP is the hydrostatic pressure over the gel layer in $dyn/cm^2$.

EXAMPLE

A 38.8% by weight acrylic acid/sodium acrylate solution was prepared by continuously mixing water, 50% by weight sodium hydroxide solution and acrylic acid, such that the degree of neutralization was 71.3 mol %. The solids content of the monomer solution was 38.8% by weight. After the components had been mixed, the monomer solution was cooled continuously to a temperature of 29° C. by means of a heat exchanger and degassed with nitrogen.

The polyethylenically unsaturated crosslinker used is poly-ethylene glycol-400 diacrylate (diacrylate of a polyethylene glycol with a mean molar mass of 400 g/mol). The use amount was 2 kg per t of monomer solution.

To initiate the free-radical polymerization, the following components were used: hydrogen peroxide (1.03 kg (0.25% by weight) per t of monomer solution), sodium peroxodisulfate (3.10 kg (15% by weight) per t of monomer solution), and ascorbic acid (1.05 kg (1% by weight) per t of monomer solution).

The throughput of the monomer solution is 18 t/h.

The individual components are metered continuously into a List Contikneter reactor with capacity 6.3 m$^3$ (from List, Arisdorf, Switzerland) in the following amounts:

18 t/h of monomer solution
36 kg/h of polyethylene glycol-400 diacrylate
74.34 kg/h of hydrogen peroxide solution/sodium peroxodisulfate solution
18.9 kg/h of ascorbic acid solution At the end of the reactor, from 750 to 900 kg/h of removed undersize with a particle size of less than 150 µm were additionally metered in.

At the feed, the reaction solution had a temperature of 23.5° C. The reactor was operated with a rotational speed of the shafts of 38 rpm. The residence time of the reaction mixture in the reactor was 15 minutes.

In the resulting product gel, a residual acrylic acid content of 0.6% by weight (based on solids content) and a solids content of 45.0% by weight were found analytically.

After polymerization and gel comminution, the aqueous polymer gel was placed onto a belt dryer. In total, 18.3 t/h of aqueous polymer gel with a water content of 55% by weight were dried. The gel was applied to the conveyor belt of the dryer from a height of 30 cm by means of a swivel belt. The height of the gel layer was approx. 10 cm.

The belt speed of the dryer belt was 0.02 m/s and the residence time on the dryer belt was approx. 37 minutes.

The dried hydrogel was ground and sieved. The fraction with particle size from 150 to 800 µm was postcrosslinked.

The postcrosslinker solution was sprayed onto the polymer particles in a Schugi® mixer. The postcrosslinker solution was a 1.2% by weight solution of ethylene glycol diglycidyl ether in propylene glycol/water (weight ratio 1:2). Based on the polymer particles, 5% by weight of solution were sprayed on. This was followed by drying at 150° C. for 60 minutes and postcrosslinking.

After removal of the oversize formed during the post-crosslinking, the water-absorbing polymer particles were delivered pneumatically. The delivery line used was a smooth pipeline of aluminum with a length of 153 m and an internal diameter of 108.5 mm. The delivery line consisted of two horizontal and two vertical sections, the sections having been connected by curves. The vertical elevation was a total of 10 m.

The delivery output was 6400 kg/h of water-absorbing polymer particles, the delivery air rate was 1050 kg/h and the gas rate was 17.8 m/s at the start of the delivery line and 26 m/s at the end of the delivery line. The pressure in the delivery line was from +500 to 0 mbar, based on the ambient pressure. The delivery material loading was 6.2 kg/kg and the Froude number at the start of the delivery was 16.8.

Before the pneumatic delivery, the water-absorbing polymer particles had an Absorption Under Load of 24.9 g/g and a permeability of $40.1 \times 10^{-7}$ cm$^3$s/g.

After the pneumatic delivery, the water-absorbing polymer particles had an Absorption Under Load of 22.4 g/g and a permeability of $30.4 \times 10^{-7}$ cm$^3$s/g.

What is claimed is:

1. A process for pneumatic delivery of water-absorbing polymer particles comprising:
   providing a compressor with a volume flow rate that falls by less than 50% when a pressure rises from no-load operation to 800 mbar connected to a delivery line; and
   operating the compressor such that an initial gas rate in the delivery line corresponds to a Froude number of from 10 to 18,
   wherein the operation of the compressor causes water-absorbing polymer particles to be pneumatically conveyed along the delivery line.

2. The process according to claim 1, wherein providing the compressor comprises providing a forced compressor.

3. The process according to claim 1, wherein a delivery material loading is from 0.5 to 20 kg/kg, the delivery material loading being a quotient of delivery material mass flow rate and gas mass flow rate.

4. The process according to claim 1, wherein the delivery line comprises a tube with a tube diameter from 3 to 30 cm.

5. The process according to claim 1, wherein the polymer particles have a water content of less than 10% by weight.

6. The process according to claim 1, wherein at least 90% of the polymer particles have a particle diameter of less than 1000 µm.

7. The process according to claim 1, wherein a mechanical stress during the pneumatic delivery is adjusted such that a permeability of the polymer particles falls by less than $5 \times 10^{-7}$ cm$^3$s/g as a result of the pneumatic delivery.

8. The process according to claim 1, wherein the polymer particles are based on polyacrylic acid.

9. The process according to claim 1, wherein the polymer particles are based on crosslinked polyacrylic acid.

10. The process according to claim 1, wherein the polymer particles are based on partly neutralized polyacrylic acid.

11. The process according to claim 2, wherein providing the compressor comprises providing a rotary piston blower.

12. The process according to claim 1, wherein operating the compressor comprises operating the compressor such that an initial gas rate in the delivery corresponds to a Froude number of from 11 to 15.

13. The process according to claim 1, wherein operating the compressor comprises operating the compressor such that an initial gas rate in the delivery corresponds to a Froude number of from 12 to 14.

* * * * *